Patented July 14, 1953

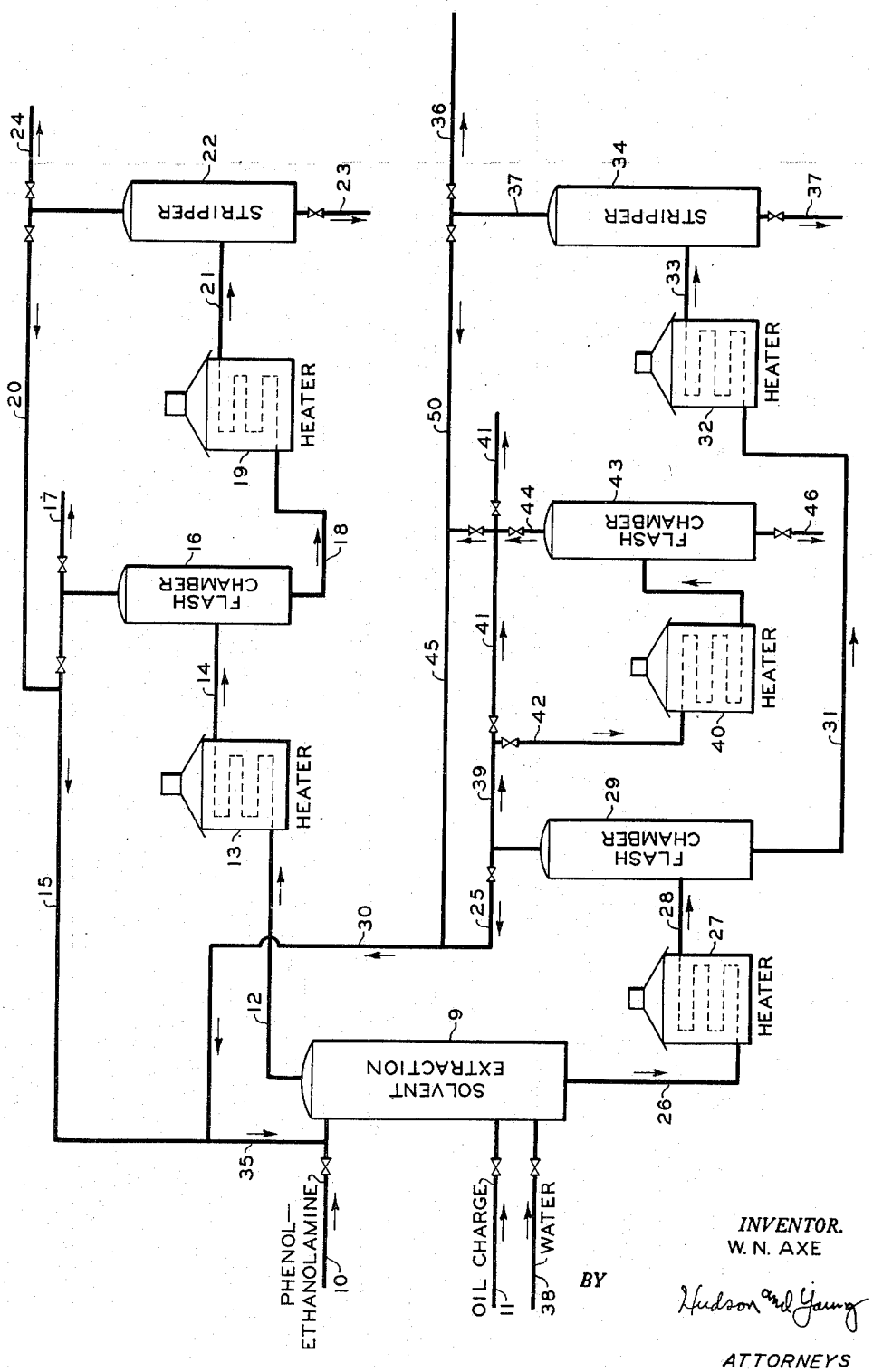

2,645,596

UNITED STATES PATENT OFFICE 2,645,596

EXTRACTION OF LUBRICATING OILS WITH A PHENOL-ALKANOLAMINE SOLVENT

William Nelson Axe, Bartlesville, Okla., assignor to Phillips Petroleum Company, a corporation of Delaware Application November 1, 1948, Serial No. 57,770

10 Claims. (Cl. 196—14.35)

This invention relates to the separation of hydrocarbons. In another aspect this invention relates to the solvent refining of hydrocarbon oils. In another aspect this invention relates to the solvent extraction of oil stocks to produce materials having improved viscosity-temperature characteristics.

Solvent extraction refers to the separation of the components of a liquid solution by treatment with an immiscible solvent in which one or more of the components of the solution are soluble. Solvent extraction is widely applied in the separation of compounds differing in chemical type which are difficult to separate by distillation because their volatilities do not differ greatly. For example, close boiling petroleum fractions differing chemically, may be almost impossible to separate by distillation but easily separable by solvent extraction, if a suitable selective solvent can be found.

Solvent extraction involves the 3 operations of first, bringing solvent and solution into intimate contact; second, separation of the resulting phases; and third, separation and recovery of solvent and solute from each phase, usually by distillation. Contacting may be accomplished in any of the several types of equipment used in the art, such as agitated vessels containing the liquids, plate columns, impinging jets of the two liquid streams, vessels with stirring means, packed towers, or the like. After separation of the phases, the solvent is usually recovered by ordinary distillation of the solvent layer, termed the "extract," and of the treated solution, termed the "raffinate."

The last few years have seen rapid development of solvent extraction processes for the refining of lubricating oils. The principal value of these processes has been their ability to produce high viscosity index oils from various Mid-continent and coastal crudes, comparable with those obtained from good Pennsylvania stocks. A wide variety of solvents have been disclosed by workers in the art, the prime requisite of the solvent, in such a lube oil refining step, being its high selectivity for the cyclic materials and its low selectivity for the paraffinic fraction, since the object of solvent extraction of lube oil stocks is to separate cyclic and paraffinic constituents. Both the quality and yield of the raffinate depend on the selectivity of the solvent. The solvent should be relatively insoluble in the oil, it should be chemically stable and non-corrosive to ordinary materials of construction, it should have a specific gravity materially different from that of the oil, and should be adaptable to economical solvent recovery.

Of the many solvents that have been proposed for the refining of petroleum oils, those most widely used include phenol, furfural, dichlorethyl ether (Chlorex), nitrobenzene, sulfur dioxide-benzene, crotonaldehyde, and cresylic acid, and of these solvents, perhaps phenol is the most generally used.

Anhydrous phenol, and phenol systems containing a small amount of water, have been widely applied in the extraction of lubricating oil stocks, due to the great stability of phenol, and to its good selectivity with regard to stocks of selected viscosity and molecular weight range, especially when water injection is employed in connection therewith. The principle of water injection is well known in the art. Water thus added dissolves immediately in the solvent and radically modifies its solvent characteristics, causing it to release paraffinic oil components together with relatively minor amounts of naphthenic components. A constant state of reflux is thereby provided, with a resulting increase in the degree of solvent-oil contacting and consequently an improved efficiency of extraction.

Although phenol is widely used in solvent extraction processes of the type discussed above, certain disadvantages are inherent in its use, especially as regards solvent extraction of light oils, such as SAE 10 grade oils, and the like. In the first place, anhydrous phenol is a solid mass at about 107° F. Secondly, light oil stocks, such as that already named, are quite soluble in phenol. Therefore, when employing phenol as a solvent in a solvent extraction of a light lubricating oil, for example, the process must be conducted within the temperature range of about 110 to about 175° F., since at higher temperatures the solubility of the paraffin constituents is excessively high in the solvent, and at lower temperatures the solvent is a solid and cannot be handled. Furthermore, at even the lower temperatures within the above-mentioned range, paraffin components are soluble to a significant extent and are thereby lost to the extract phase. Similarly, at temperatures above this range, excessive amounts of solvent are lost to the raffinate and the selectivity of the solvent is materially reduced with resulting uneconomical and inefficient extractive operation.

Of the various means already stated for conducting solvent extraction, perhaps countercurrent extraction in a packed column is most generally used. In such general practice, the oil stock may be introduced at the bottom of a countercurrent extraction column and the solvent may be introduced at the top. The two liquids flow countercurrent to each other, the extract phase being removed at the bottom and the raffinate phase being removed at the top. When operating in a countercurrent system, it is of major importance that a temperature gradient of a maximum allowable range be employed since under such conditions the maximum constant interchange of paraffinic and naphthenic components takes place and equilibrium is reached in the shortest possible length of time. Generally, it is preferred to employ a maximum temperature gradient in a countercurrent extraction column, which gradient is necessarily within the limits of that determined by the characteristics of the oil stock, i. e., the pour point and general flow viscosity characteristics, and the temperature of critical solution. It is usually advantageous to employ a top temperature within the range of 200–250° F. However, when employing phenol in the solvent extraction of light lube oil stocks, the upper limit of such a temperature gradient is in the order of about 175 to 180° F. and the lower limit is that at which phenol exists as a liquid which is generally about 107–110° F. Under these conditions of operation, the extraction process is inefficient and uneconomical, and it has been the practice of workers in the art to compensate for these relatively narrow temperature limits by injecting water into the extract phase at a point near the bottom of the column, to provide reflux, as already discussed. This very effective mode of operation, however, results in the formation of a corrosive liquid and requires additional facilities in the solvent recovery system for dehydrating the phenol. Furthermore, due to the strong solvent action of phenol on low viscosity distillates, the phenol solvent system is of little use in the extraction of light oils, such as SAE 5 grade, and of high viscosity index torque converter or hydraulic fluids.

This invention is concerned with the improvement of temperature viscosity characteristics of a hydrocarbon oil by solvent extraction means employing novel phenol solvent mixtures comprising phenol and an alkanolamine, wherein many of the undesirable features arising from the use of phenol as a solvent are eliminated, wherein all of the desirable characteristics are retained, and wherein raffinate of improved high quality and yield is obtained.

An object of this invention is to provide a process for the solvent extraction of hydrocarbons.

Another object is to provide a process for the separation of hydrocarbons.

Another object is to provide a process utilizing new solvent mixtures for the solvent extraction of hydrocarbons.

Another object is to provide a process utilizing novel phenol-alkanolamine mixtures as solvents in the solvent extraction of lubricating oils.

Other objects of this invention will become apparent, to those skilled in the art, in the light of the accompanying discussion and disclosure.

In accordance with my invention, an oil stock is refined by solvent extraction means employing a new and novel solvent comprising a mixture of a phenol and an alkanolamine, wherein an improved extractive efficiency is obtained. Hydrocarbons of unlike types, such as cyclics and paraffins, aromatics and paraffins, and the like, are separated in accordance with my invention.

I have found that the general solvent system, phenol-alkanolamine greatly extends the usefulness of phenol as a solvent extraction agent. The phenol-alkanolamine solvents of my invention are chemically stable and relatively non-corrosive to materials of construction ordinarily used in the fabrication of solvent extraction equipment, as compared to phenol-water mixtures similarly applied. When utilizing the solvents of my invention in countercurrent solvent extraction, a greatly increased temperature gradient relative to that permitted with phenol alone, is provided. Furthermore, in the practice of my invention in countercurrent solvent extraction, the necessity for employing water injection, or in general any such anti-solvent, is eliminated.

Alkanolamines employed in the practice of my invention are preferably monoalkanolamines having from 2 to 10 or more carbon atoms per molecule, the upper limit being determined only by the practical problems involved in the separation of solvent from the raffinate. In the general processing of lubricating oil stocks, it is preferred to employ an alkanolamine boiling below 400° F. Among the various alkanolamines that may be employed in the practice of my invention are ethanolamine, 3-amino-n-propyl alcohol, aminoisopropyl alcohol, 2-amino-n-pentanol-3, 3-amino-n-pentanol-2, 2-amino-4-methyl-pentanol-1, and the like. In some instances, polyalkanolamines, such as diethanolamine and triethanolamine, may be employed where exceptionally high boiling oils are processed.

The solvent system, phenol-alkanolamine, can be adjusted to fit the needs of any particular solvent extraction process, since the alkanolamine and phenol are miscible at all temperatures. For very light distillate oils, such as light lubricants of 5 W grade and hydraulic fluids, and the like, the solvent may contain from 10 to 20 per cent of alkanolamine, or even higher, while for heavy residual stocks the solvent may contain as little as 1 per cent of the amine, and still be highly selective.

In a preferred embodiment of my invention I employ, as a solvent pair, phenol and ethanolamine. In the following description a preferred embodiment of my invention will be specifically disclosed. The figure is a diagrammatic illustration of one form of apparatus in which my process may be practiced. It is to be understood that this flow diagram is diagrammatic only and may be altered in many respects, by those skilled in the art, and still remain within the intended scope of my invention.

Referring to the drawing, phenol-ethanolamine solvent prepared by blending 10 parts by weight of ethanolamine with 90 parts by weight of anhydrous phenol to form a homogeneous solution is introduced through line 10 to an upper portion of countercurrent contacting tower 9, and a raw Mid-Continent oil stock of SAE 10 viscosity grade is introduced to countercurrent contacting tower 9 through line 11. Tower 9 is packed with such materials as Raschig rings, to provide suitable means for contacting oil and solvent. The solvent and oil are introduced to contacting tower 9 at such a rate as to provide a predetermined solvent to oil volume ratio, depending upon the oil stock, the solvent composition, and the degree of refining desired, which in this case is within the range of from 1:1 to 2:1. Raffinate is withdrawn from the top of contacting column 9 through line 12 and passed through heater 13 wherein the temperature of the oil-solvent stream is raised to about 500° F. Raffinate phase thus heated, is discharged from heater 13 through line 14 into flash chamber 16 wherein the major proportion of the solvent is separated. Solvent, separated in flash chamber 16, is passed overhead through line 17 to solvent storage means, not shown. If desired, solvent recovered in chamber 16 may be recycled to line 10 through lines 15 and 35. Residual raffinate in chamber 16, contains from about 0.5 to 2 per cent solvent and is discharged from chamber 16 through line 18 to heater 19 wherein it is heated to a temperature in the range of about 400 to about 600° F., and then through line 21 to stripper 22 wherein last traces of solvent are removed under distillation conditions, at a temperature in the range of from 400-600° F., in the presence of steam. Solvent recovered from stripper 22 may be recycled to line 10, if desired, through lines 20, 15 and 35. Solvent-free raffinate is removed from stripper 22 through line 23 and passed to storage means, not shown. Extract from column 9 contains the extract oil and the major proportion of solvent introduced through line 10, and is passed from chamber 9 through line 26 to heater 27, heated therein to a temperature in the order of from 500-700° F. and discharged through line 28 to flash chamber 29 where the major proportion of the solvent is separated. Solvent thus separated in chamber 29 is passed through lines 39 and 41 to solvent storage means, not shown, or directly recycled through lines 25, 30 and 35. Residual extract phase from flash chamber 29 contains traces of solvent usually in the order of from 1 to 3 per cent and is withdrawn from chamber 29 through line 31, is passed to heater means 32 and discharged therefrom at a temperature in the range of 400-600° F., through line 33 to stripper 34, wherein any remaining solvent is removed in a manner similar to that already described in connection with stripper 22. Solvent-free extract oil is passed from stripper 34 through line 37 to extract storage means, not shown. Solvent separated in zone 34 may be recycled to line 10, if desired, through lines 37, 50, 45, 30 and 35.

In the practice of one form of my preferred embodiment, extremely high selectivity may be obtained by means of water injection, in which case water may be injected into the extract phase in the bottom of column 9 through line 38, in an amount usually within the limits of from 1 to 10 per cent to provide additional reflux. In such a contingency, solvent passed from chamber 29 through line 39 to storage means, is first passed through line 42, heated in heater 40, and then passed to an additional flash chamber 43 in order to dehydrate the solvent. In this case, overhead from chamber 43 comprises anhydrous phenol and is passed through lines 44 and 41 to storage, or it may be recycled to line 10 through lines 45, 30 and 35. Water is withdrawn from zone 43 through line 46.

For convenience and clarity certain apparatus, such as pumps, surge tanks, accumulators, valves, etc., have not been shown in the drawing. Obviously, such modifications of the present invention may be practiced without departing from the scope of the invention.

When employing an ethanolamine-solvent system, solvent recovery systems can be operated in substantially the same manner as that for a single solvent system, such as phenol, due to the fact that the phenol-ethanolamine solvent is ordinarily distilled over a range of from 358 to about 366° F. The ethanolamine-phenol solvent pair of this invention forms an azeotrope of the maximum boiling type which permits the phenol to distill before the azeotrope even though ethanolamine boils about 19° F. lower than phenol. In any combination of phenol and ethanolamine, the solvent is completely evaporated at about 370° F. at atmospheric pressure.

The use of the phenol-alkanolamine solvents of my invention is particularly applicable to distillate oils ranging from gas oil through the SAE 30 grade oils. Due to the high selectivity of the solvents of my invention and to the adjustable solubility of oils in these new solvents, they may be advantageously employed in the solvent extraction of coastal oils of the naphthenic type.

The importance of operating a countercurrent extraction column with a wide temperature differential between the top and bottom of the tower has already been stated. In countercurrent extraction of a light oil, such as a gas oil fraction, a solvent containing 15 per cent ethanolamine permits a top tower temperature of at least 200° F., often as high as 225° F., with the bottom temperature limited only by the pour point of the raw oil being charged. When employing phenol alone in the extraction of a similar oil, the process is inoperative at low temperatures since phenol will solidify at temperatures approximating 110° F. and lower. With an SAE 10 Mid-Continent waxy distillate, a top tower temperature of 220-250° F. can be maintained with a bottom temperature of about 135° F. limited by the pour point of the oil, when using solvents of my invention. In the case of anhydrous phenol alone, such a differential is of the order of only from 30-50° F. with an undesirably low extractive efficiency being obtained as compared with that utilized when employing a phenol-ethanolamine solvent of my invention.

My invention will be further illustrated and defined by the following examples. The reactants and their proportions and other specific ingredients are presented as being typical and should not be construed to limit the invention unduly.

*Example 1*

A dewaxed raw SAE 10 Mid-Continent oil having a viscosity index of 71 was thoroughly contacted in a single stage extraction at 150° F. with an equal volume of a solvent consisting of 1 part ethanolamine and 10 parts phenol. The raffinate layer was found to contain 80 per cent of the original oil charged associated with 14 per cent of the original solvent. The viscosity index of the raffinate was found to be 81, an increase of 10 units.

A control run was carried out in the same manner using anhydrous phenol as the solvent. The yield of raffinate in this case was 70 per cent and the associated solvent amounted to 20 per cent of the solvent charge. The viscosity index of the raffinate was 82.

These runs demonstrate the superior selectivity obtained when employing a solvent of this invention; a very substantial increase in raffinate yield is obtained with no sacrifice in quality. Furthermore, the amount of solvent lost to the raffinate is significantly lowered.

*Example 2*

A comparison of a mixed solvent of this invention, 10 per cent ethanolamine in anhydrous phenol, with phenol was carried out in a countercurrent extraction column using an acid treated and dewaxed Mid-Continent neutral oil as the charge stock. Water injection was employed in both runs.

|  | Charge Stock | Phenol | 10% Ethanolamine, 90% Phenol |
|---|---|---|---|
| Extraction Conditions: |  |  |  |
| Top column temp., °F |  | 220 | 180 |
| Bottom column temp., °F |  | 155 | 139 |
| Solvent/oil vol. ratio |  | 1.6 | 1.0 |
| Water/solvent vol. ratio |  | 0.1 | 0.09 |
| Raffinate: |  |  |  |
| Yield |  | 91 | 96.6 |
| Viscosity at 210° F., SUS | 53.4 | 51.6 | 51.9 |
| Viscosity at 100° F., SUS | 343.9 | 295.9 | 307.6 |
| Viscosity index | 86 | 93 | 90 |
| API gravity at 60/60 | 28.3 | 29.7 | 29 |
| Extract: API gravity at 60/60 |  | 12.1 | 10.5 |

The superiority of the ethanolamine-phenol system is apparent. It is demonstrated, that in countercurrent contacting systems, as well as in other solvent extraction systems, as illustrated in Example 1, high quality raffinate is obtained in significantly higher yield when employing a solvent of this invention, than when employing phenol alone.

*Example 3*

A solvent consisting of 10 per cent ethanolamine in phenol was investigated, without the use of injected water, using the same charge oil and extraction equipment employed in obtaining the data of Example 2.

|  | Run #1 | Run #2 | Run #3 |
|---|---|---|---|
| Extraction Conditions: |  |  |  |
| Top column temp., °F | 181 | 200 | 202 |
| Bottom column temp., °F | 155 | 104 | 102 |
| Solvent/oil vol. ratio | 0.97 | 1.03 | 1.48 |
| Raffinate: |  |  |  |
| Yield | 95.7 | 95.8 | 95.1 |
| Viscosity at 210° F., SUS | 51.96 | 51.86 | 51.93 |
| Viscosity at 100° F., SUS | 307.5 | 307.3 | 304.2 |
| Viscosity Index | 90 | 89 | 92 |
| API gravity at 60/60 | 29 | 29 | 29.2 |
| Extract: API gravity at 60/60 | 13.6 | 13.5 | 13.0 |

The high yields characteristic of a solvent system of this invention are clearly indicated. In comparing Run #3 with the conventional phenol system of Example 2, it is seen that at comparable solvent/oil ratios, substantially the same quality level is obtained in each instance, and that an appreciably higher yield (5.1%) is obtained with the mixed solvent, without the aid of water injection.

I claim:

1. A process for the solvent extraction of a light lube oil stock, comprising countercurrently contacting said lube oil stock with a downwardly moving solvent material comprising from 1 to 20 weight per cent ethanolamine dissolved in phenol, maintaining a temperature in the top portion of the zone of said contacting within the range of 200–250° F., maintaining a temperature in the bottom portion of said zone at a level at least as high as the pour point of said oil, withdrawing raffinate phase from the top of said zone, withdrawing extract phase from the bottom of said zone, recovering said solvent from each said phase, recovering solvent-free extract, and recovering solvent-free raffinate as a product of the process.

2. The process of claim 1 in which from 1 to 10 weight per cent of water based on the weight of the extract phase is introduced into a lower part of said zone.

3. A process which comprises contacting, in an extraction zone, a hydrocarbon lubricating oil stock with a solvent mixture comprising from 1 to 20 weight per cent of an alkanolamine dissolved in a phenol, said zone being maintained within a temperature range, the upper limit of which is 250° F. and the lower limit of which is the pour point of said oil stock, said alkanolamine having from 2 to 10 carbon atoms per molecule, and recovering a raffinate oil having an increased viscosity index.

4. The process of claim 3 in which said solvent mixture is a solution of mono-ethanolamine in phenol.

5. The process of claim 3 in which said solvent mixture is a solution of aminoisopropyl alcohol in phenol.

6. The process of claim 3 in which said solvent mixture is a solution of 3-amino-n-propyl alcohol in phenol.

7. A selective solvent mixture for the refining of a hydrocarbon lubricating oil stock by extraction of said stock at a temperature in the range from the pour point of said stock to 250° F., said solvent mixture consisting essentially of a solution of an alkanolamine containing from 2 to 10 carbon atoms per molecule in phenol, the concentration of said alkanolamine in said solution being in the range 1 to 20 weight per cent.

8. The solvent mixture of claim 7 wherein said alkanolamine is mono-ethanolamine.

9. The solvent mixture of claim 7 wherein said alkanolamine is aminoisopropyl alcohol.

10. A solvent mixture according to claim 7 wherein said alkanolamine is 3-amino-n-propyl alcohol.

WILLIAM NELSON AXE.

References Cited in the file of this patent

UNITED STATES PATENTS

| Number | Name | Date |
|---|---|---|
| 2,017,432 | Bahlke | Oct. 15, 1935 |
| 2,076,105 | Volck | Apr. 6, 1937 |
| 2,215,359 | Livingston et al. | Sept. 17, 1940 |
| 2,215,915 | Cope et al. | Sept. 24, 1940 |
| 2,337,732 | Burk et al. | Dec. 28, 1943 |
| 2,364,517 | Burk | Dec. 5, 1944 |
| 2,396,303 | Cummings et al. | Mar. 12, 1946 |